(12) United States Patent
Turcotte

(10) Patent No.: US 10,024,239 B2
(45) Date of Patent: Jul. 17, 2018

(54) FUEL FILTER AND BYPASS VALVE ARRANGEMENT

(71) Applicant: PRATT & WHITNEY CANADA CORP., Longueuil (CA)

(72) Inventor: Herve Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 419 days.

(21) Appl. No.: 14/805,508

(22) Filed: Jul. 22, 2015

(65) Prior Publication Data

US 2017/0021292 A1     Jan. 26, 2017

(51) Int. Cl.
| | |
|---|---|
| *B01D 35/147* | (2006.01) |
| *B64D 37/34* | (2006.01) |
| *F02C 7/22* | (2006.01) |
| *F02M 37/22* | (2006.01) |

(52) U.S. Cl.
CPC .............. *F02C 7/22* (2013.01); *F02M 37/223* (2013.01); *B01D 35/147* (2013.01); *F05D 2260/607* (2013.01); *Y02T 50/671* (2013.01); *Y02T 50/675* (2013.01)

(58) Field of Classification Search
CPC .... F02M 37/22; F02M 37/223; B01D 27/103; B01D 29/15; B01D 29/90; B01D 35/18; B01D 35/147; F02C 7/22; F05D 2260/607
See application file for complete search history.

(56) References Cited

U.S. PATENT DOCUMENTS

| | | | | |
|---|---|---|---|---|
| 4,201,044 A | * | 5/1980 | Dodd ........................ | F02C 7/22 210/132 |
| 4,478,197 A | * | 10/1984 | Yasuhara .............. | F02D 33/006 123/510 |
| 4,932,205 A | | 6/1990 | Alderfer et al. | |
| 6,251,270 B1 | | 6/2001 | Blot-Carretero et al. | |

* cited by examiner

*Primary Examiner* — Terry K Cecil
(74) *Attorney, Agent, or Firm* — Norton Rose Fulbright Canada LLP

(57) ABSTRACT

A gas turbine engine has a fuel system including an apparatus. The apparatus includes a housing containing at least a fuel filter assembly and a bypass valve assembly within the housing. The bypass valve assembly selectively opens or closes a bypass passage which bypasses a filtering unit of the fuel filter assembly. In accordance with one aspect, respective first and second fuel flows are introduced into the housing to be merged and mixed therein prior to entering the fuel filter assembly or the bypass valve assembly. In accordance with another aspect, an ice accretion device is provided within the housing to allow ice formation and accumulation thereon as a result of a transient icing occurrence when the mixed fuel flows in the housing pass through the ice accretion device to enter the fuel filter assembly.

18 Claims, 7 Drawing Sheets

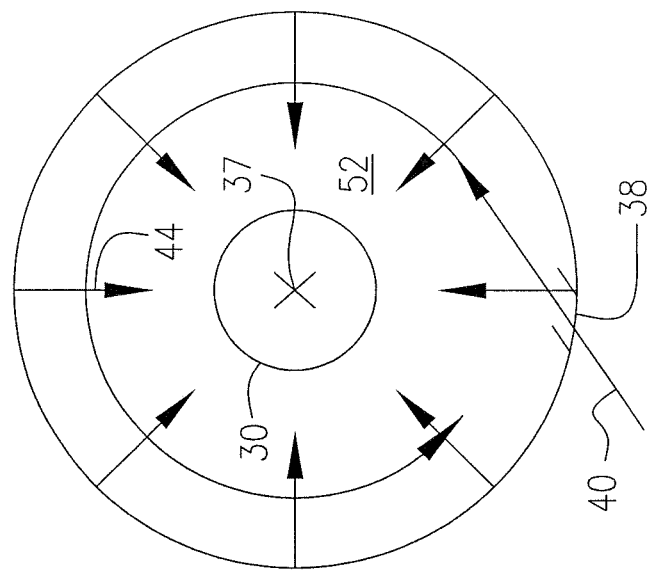
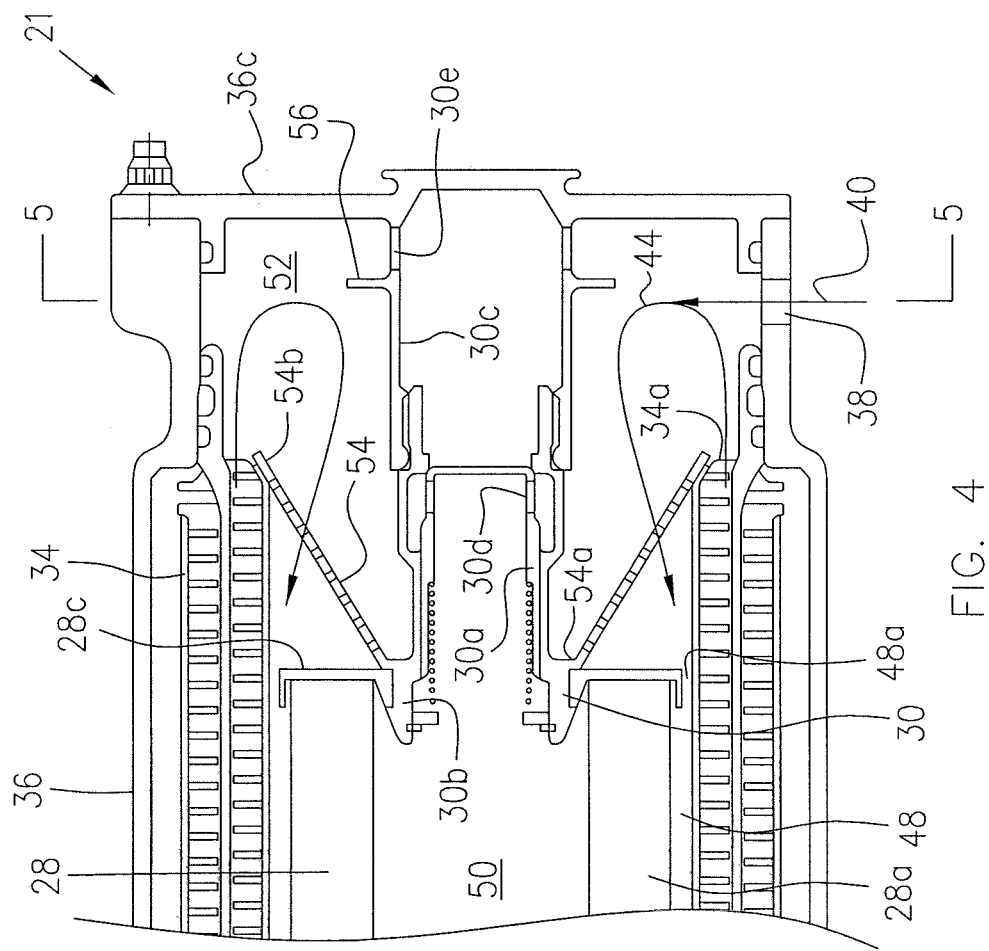

FUEL FILTER AND BYPASS VALVE ARRANGEMENT

TECHNICAL FIELD

The application relates generally to gas turbine engines, and more particularly, to a fuel filter and bypass valve arrangement for such engines.

BACKGROUND OF THE ART

The formation of ice in aircraft fuel is an unavoidable problem because in warmer climates water becomes entrained in the fuel where it does not present a problem when the temperature is above freezing point, but when the temperature drops below the freezing point the entrained water may form ice crystals which can block fuel filters in aircraft fuel systems, particularly at high fuel flow rates such as during aircraft take-off. It is known to provide a bypass valve in an aircraft fuel supply system such that when the fuel filter is blocked by ice formation, the bypass valve can be actuated to allow fuel to bypass the fuel filter and flow directly to, for example a fuel regulator. Various efforts to improve such fuel filter and bypass valve arrangements have been and continue to be made in order to overcome associated problems such as limited transient icing capability, relatively bulky and heavy configurations, etc.

Therefore, there is a need for an improved fuel filter and bypass valve for aircraft gas turbine engines.

SUMMARY

In accordance with one aspect, a gas turbine engine has a fuel system including an apparatus, the apparatus comprising: a housing defining a longitudinal axis and containing a fuel filter assembly, the housing defining a chamber extending longitudinally between the fuel filter assembly and an end wall of the housing, the chamber being in fluid communication with the fuel filter assembly via a filter entry, the housing including a first inlet port for introducing a first fuel flow into the chamber and a second inlet port for introducing a second fuel flow into the chamber, the first and second inlet ports being positioned such that the first and second fuel flows mix one with the other within the chamber prior to entering the fuel filter assembly via the filter entry.

In accordance with another aspect, a gas turbine engine has a fuel system including an apparatus, the apparatus comprising: a housing defining a longitudinal axis and containing a fuel filter assembly, a bypass valve assembly and an ice accretion device within the housing, the bypass valve assembly being connected to the fuel filter assembly, the housing defining a chamber surrounding the bypass valve assembly, and having a first inlet port for introducing a first fuel flow into the chamber, the chamber extending longitudinally between the fuel filter assembly and an end wall of the housing, the chamber being in fluid communication with the fuel filter assembly via a filter entry and being in fluid communication with the bypass valve assembly via a valve entry, the ice accretion device being positioned in the chamber between the filter entry and the valve entry to allow ice formation and accumulation on the device, the bypass valve assembly being open only when a fuel pressure in the chamber rises to a predetermined level, to allow fluid communication between the chamber and a bypass passage which bypasses a filtering unit of the fuel filter assembly.

In accordance with a further aspect, a gas turbine engine has a fuel system including an apparatus, the apparatus comprising: a housing defining a longitudinal axis and containing a fuel filter assembly, a bypass valve assembly, a fuel/oil heat exchanger and a perforated baffle within the housing, the housing defining a chamber surrounding the bypass valve assembly, the chamber extending longitudinally between the fuel filter assembly and an end wall of the housing, the chamber being in fluid communication with the fuel filter assembly via a filter entry and being in fluid communication with the bypass valve assembly via a valve entry, the perforated baffle being positioned in the chamber between the filter entry and the valve entry to allow ice formation and accumulation on the perforated baffle, the bypass valve assembly being open only when a fuel pressure in the chamber rises to a predetermined level, to allow fluid communication between the chamber and a bypass passage which bypasses a filtering unit of the fuel filter assembly, the housing defining a first inlet port for introducing a first fuel flow into the chamber and a second inlet port for introducing a second fuel flow to pass through and to be heated by the fuel/oil heat exchanger and then enter the chamber such that the first and second fuel flows mix one with the other in the chamber prior to entering into the filter entry or the valve entry.

DESCRIPTION OF THE DRAWINGS

Reference is now made to the accompanying figures in which:

FIG. 4 is a partial side cross-sectional view of the apparatus of FIG. 2, showing a pre-mix area in the apparatus for mixing low pressure fuel and high pressure fuel prior to the mixed fuel entering a fuel filter or a bypass valve:

FIG. 5 is a cross-sectional view taken along line 5-5 in FIG. 4, showing the respective flow directions of the low pressure and high pressure fuel flows;

It will be noted that throughout the appended drawings, like features are identified by like reference numerals.

DETAILED DESCRIPTION

Figure 1:
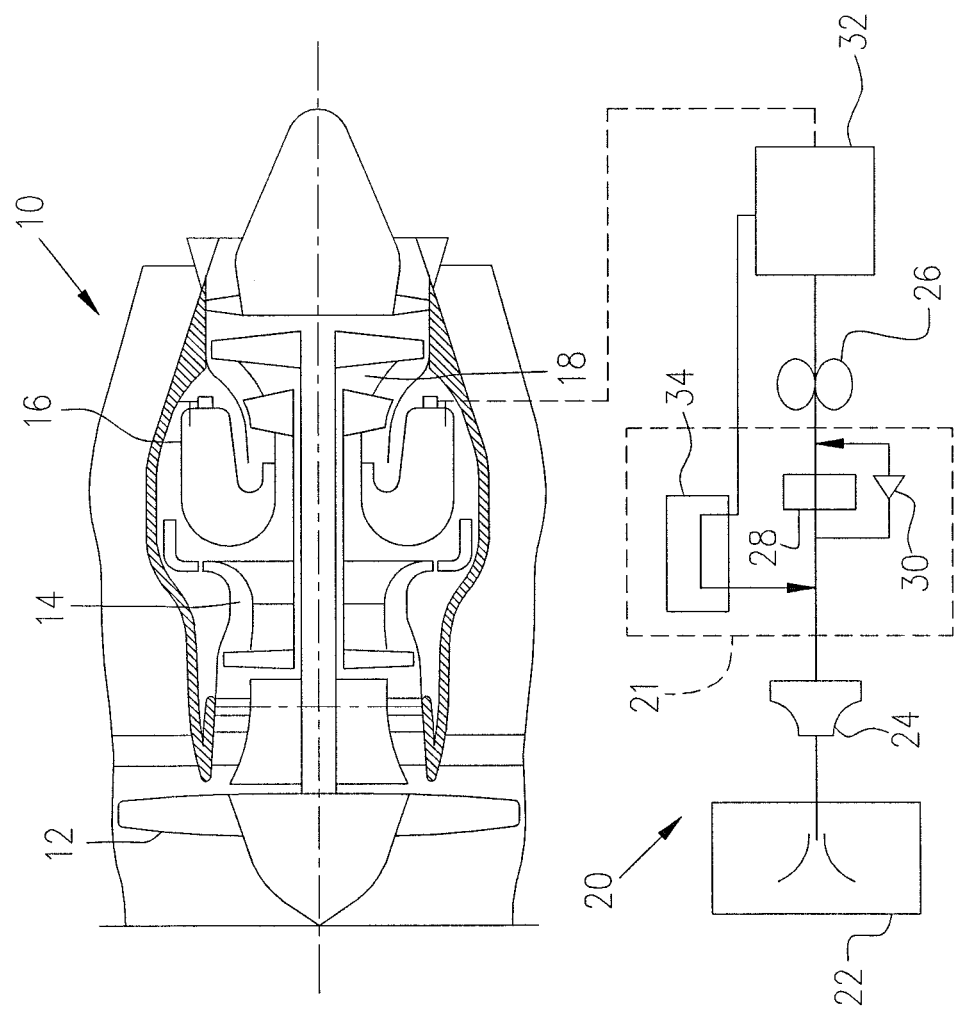
FIG. 1 is a schematic side cross-sectional view of a gas turbine engine as an example of the application of the described subject matter, with a diagram illustrating an example of a fuel supply system of the engine.

FIG. 1 illustrates a turbofan gas turbine engine 10, which is taken as an examplary application of the described subject matter. The gas turbine engine 10 generally comprises in serial flow communication a fan 12 through which ambient air is propelled, a compressor section 14 for pressurizing the air, a combustor 16 in which the compressed air is mixed with fuel and ignited for generating an annular stream of combustion gases, and a turbine section 18 for extracting energy from the combustion gases. The gas turbine engine 10 includes a fuel supply system 20 which may generally include a fuel tank 22, low pressure and high pressure pumps 24, 26, a fuel filter assembly 28, a bypass valve assembly 30 and a fuel control unit 32 for providing a fuel supply to the combustor 16 for burning and generating the combustion gases for the engine. The fuel supply system 20 may also include a fuel/oil heat exchanger (FOHE) 34 for at least partially heating the fuel circulated in the fuel supply system 20. The FOHE 34 is associated with an oil system of the engine such that fuel flow passing through the FOHE 34 is heated by a warmer oil flow circulating through the oil system of the engine.

Figure 2:
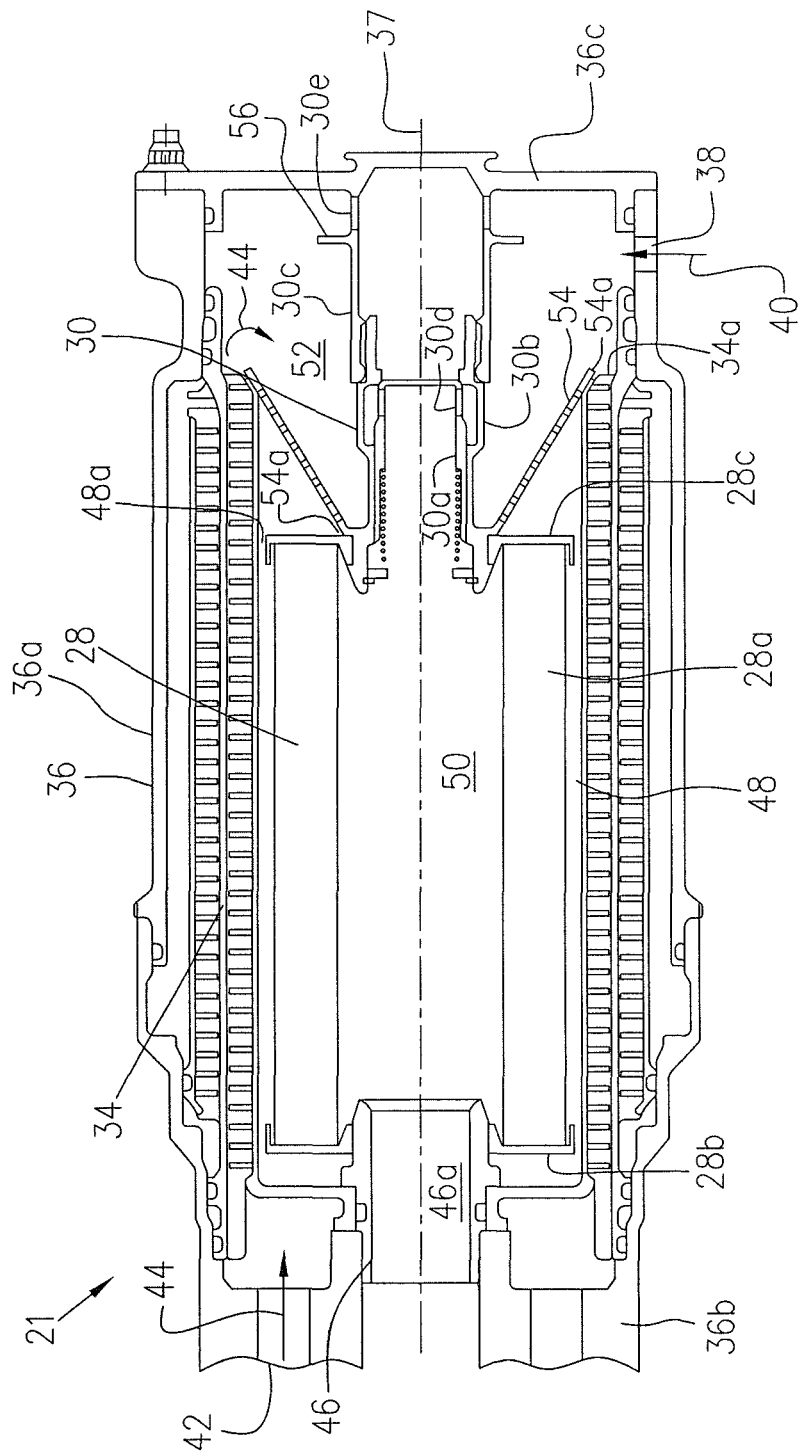
FIG. 2 is a side cross-sectional view of an apparatus showing a fuel filter and bypass valve arrangement in the fuel supply system of FIG. 1, according to one embodiment.

Referring to FIGS. 1 and 2, according to one embodiment, an apparatus 21 included in the fuel supply system 20 may be configured to provide a fuel filter and bypass valve arrangement. The apparatus 21 may generally include a housing 36 containing therein the fuel filter assembly 28, the bypass valve assembly 30 and optionally the FOHE 34. The housing 36 may define a first inlet port 38 for introducing a low pressure fuel flow 40 pumped from the low pressure pump 24 and a second inlet port 42 for introducing a high pressure fuel flow 44 from the fuel control unit 32 into the housing 36. The housing 36, fuel filter assembly 28, bypass valve assembly 30 and the FOHE 34 may optionally be provided in a cylindrical configuration according to one embodiment.

The housing 36 may have a cylindrical wall 36a defining a longitudinal axis 37 thereof. The cylindrical wall 36a of the housing 36 may extend longitudinally from a housing head 36b towards and may terminate at an open end which is covered by a removably attached cap plate 36c. The cylindrical FOHE 34 may have an annular configuration which is supported within and by the cylindrical wall 36a of the housing 36 and surrounds the fuel filter assembly 28. The fuel filter assembly 28 may include an annular filtering unit 28a supported by, for example longitudinally opposed end plates 28b and 28c. A support structure 46 may be provided to secure the end plate 28b of the fuel filter assembly 28 to the housing head 36b as well as to position the fuel filter 28 within the annular configuration of the cylindrical FOHE 34 in order to define an annular gap 48 therebetween. The annular filtering unit 28a with the supporting end plates 28b, 28c defines a central passage 50 extending longitudinally through the fuel filter assembly 28.

Figure 3:
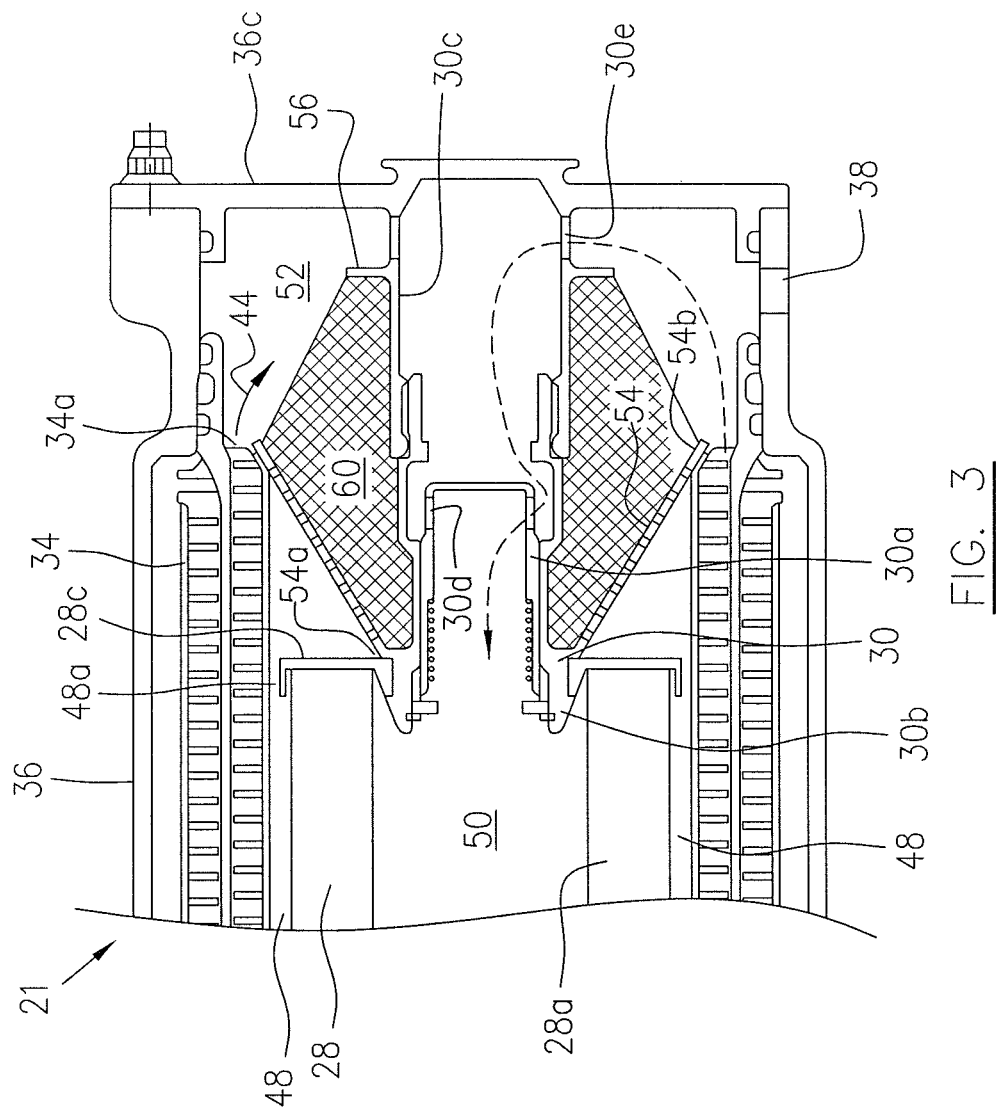
FIG. 3 is a partial side cross-sectional view of the apparatus of FIG. 2, showing an ice accretion device in the apparatus, according to one embodiment.

Referring to FIGS. 2-4, the bypass valve assembly 30 may include a hollow cylindrical valve seat 30b which may be connected at one end thereof to the fuel filter assembly 28, for example to the supporting end plate 28c, and may be connected at the other end thereof, for example by threading engagement, with a hollow cylindrical valve support body 30c which is in turn secured to or integrated with the cap plate 36c. A hollow cylindrical valve member 30a is longitudinally slidably received within the hollow cylindrical valve seat 30b. Under a biasing spring force the valve member 30a is pushed to have a closed end thereof seated on an annular shoulder of the valve seat 30b to thereby close the bypass valve assembly 30 (see FIGS. 2 and 4). When a fuel pressure within the hollow cylindrical valve support body 30c (which will be further described hereinafter) reaches a predetermined level, the hollow cylindrical valve member 30a is forced to move away from the annular shoulder, against the biasing spring force. Therefore, the inside of the hollow cylindrical valve member 30a and the inside of the hollow cylindrical valve support body 30c are in fluid communication via a plurality of openings 30d in the valve member 30a and an annular gap between the closed end of the valve member 30a and the annular shoulder of the valve seat 30b, such that the bypass valve assembly 30 is open (see FIG. 3).

A chamber 52 which may be annular, may provide a fuel pre-mixing area. The annular chamber 52 may be defined within the housing 36, surrounding the bypass valve assembly 30 and extending longitudinally between the end plate 28c of the fuel filter assembly 28 and an end wall of the housing 36 which may be formed by the cap plate 36c. The chamber 52 may be in fluid communication with the first inlet port 38 for introducing the low pressure fuel flow 40 into the chamber 52, and may be in fluid communication with the second inlet port 42 via the FOHE 34, for introducing the high pressure fuel flow 44 into the chamber 52 after the high pressure fuel flow 44 has been heated while passing through the FOHE 34. The low pressure and high pressure fuel flows 40, 44 in the chamber 52 are merged and mixed one with the other.

The chamber 52 may also be in fluid communication with the fuel filter assembly 28 via a filter entry 48a such as an annular gap between the supporting end plate 28c of the fuel filter assembly 28 and the FOHE 34 (part of the annular gap 48) such that the mixed low pressure and high pressure fuel flows 40, 44 can enter the annular gap 48 and flow radially inwardly through the filtering unit 28a into the central passage 50. The mixed low pressure and high pressure fuel flows 40, 44 in the central passage 50 of the fuel filter assembly 28 then discharge through openings in the respective support structure 46 and in the housing head 36b, to be delivered to the high pressure pump 26 and the fuel control unit 32 (see FIG. 1).

The chamber 52 may also be in fluid communication with the inside of the hollow cylindrical valve support body 30c via a valve entry 30e. The valve entry 30e may be defined by a plurality of circumferentially spaced openings in the valve support body 30c, longitudinally adjacent the cap plate 36c. When the pressure of the mixed low pressure and high pressure fuel flows 40, 44 in the chamber 52 reaches a predetermined level, the valve member 30a is forced to move back against the biasing spring force to open the bypass valve assembly 30, thereby allowing the mixed low and high pressure fuel flows 40, 44 (represented by a broken line arrow in FIG. 3) to enter the bypass valve assembly 30 which is in fluid communication with the central passage 50 of the fuel fitter assembly 28, and to then pass through the central passage 50, bypassing the filtering unit 28a. This fuel flow condition will be further described hereinafter.

Referring to FIGS. 2-5, the annular FOHE 34 may be configured to have a longitudinal end 34a extending into the annular chamber 52 and being located, for example in a longitudinally middle area of the annular chamber 52, radially distal from the bypass valve assembly 30. The high pressure fuel flow 44 which has been heated while passing through the annular FOHE 34, may be discharged from the longitudinal end 34a of the FOHE 34, and may then disperse throughout the annular chamber 52 generally in radial and inward directions as shown in FIG. 5. The first inlet port 38 may be located longitudinally between the longitudinal end 34a of the FOHE 34 and the cap plate 36c, for example more adjacent the cap plate 36c. The first inlet port 38 may be oriented in a tangential direction with respect to the longitudinal axis 37 such that the low pressure fuel flow 40 introduced through the first inlet port 38, moves through the annular chamber 52 in a generally circumferential direction around the bypass valve assembly 30. Therefore, the low pressure fuel flow 40 and the high pressure fuel flow 44 may be fully merged and effectively mixed within the annular chamber 52 prior to entering the fuel filter assembly 28 via the filter entry 48a or prior to entering the bypass valve assembly 30 via the valve entry 30e.

The bypass valve assembly 30 is normally closed such that the mixed low pressure and high pressure fuel flows 40, 44 must enter the fuel filter assembly 28 to be filtered prior to being delivered to the high pressure pump 26 and fuel control unit 32 shown in FIG. 1. When transient icing occurs within the fuel filter assembly 28 or on the filter entry 48a, the pressure of the mixed low pressure and high pressure fuel flows 40, 44 in the annular chamber 52 increases. When the fuel pressure in the annular chamber reaches a predetermined level the valve member 30a is forced to move back against the biasing spring force, forcing the bypass valve assembly 30 to open, allowing the mixed low pressure and high pressure fuel flows 40, 44 to enter the central passage 50 of the fuel filter assembly 28, bypassing the annular filtering unit 28a. Under such conditions, no more fuel can pass through the filter entry 48a and filtering unit 28a, and the transient icing therein discontinues. Heat from the FOHE 34 surrounding the fuel filter assembly 28 may eventually melt the ice, allowing the fuel filter assembly 28 to recover its fuel filtering function thereby allowing the mixed low pressure and high pressure fuel flows 40, 44 to resume passing through the fuel filter assembly 28 without blockage. As a result of the fuel filtering function, the fuel pressure in the annular chamber 52 drops. The drop in pressure in the annular chamber 52 allows the biasing spring force to return the valve member 30a to be seated against the annular shoulder of the valve seat 30b, thereby closing the bypass valve assembly 30 which allows the entire mixed low pressure and high pressure fuel flows 40, 44 in the annular chamber 52 to resume entering the fuel filter assembly 28 via the filter entry 48a.

In order to increase ice catching capabilities and improve filtering efficiency, the housing 36 may further include an ice accretion device such as a perforated baffle 54 positioned for example in the annular chamber 52 longitudinally between the filter entry 48a and the valve entry 30e, to allow ice formation and accumulation thereon. In accordance with one embodiment, the perforated baffle 54 may be annular and may be positioned to surround the bypass valve assembly 30. The annular perforated baffle 54 may have a truncated conical configuration including a first end 54a having a first diameter and a longitudinally opposed second end 54b having a second diameter greater than the first diameter. The first end 54a of the annular perforated baffle 54 may be positioned adjacent the supporting end plate 28c of the fuel filter assembly 28 and may be supported on the bypass valve assembly 30, such as on the hollow cylindrical valve seat 30b. The second end 54b of the annular perforated baffle 54 may be supported on the longitudinal end 34a of the FOHE 34 which extends into the annular chamber 52. The annular perforated baffle 54 therefore separates the valve entry 48a from the pre-mixing area of the annular chamber 52 where the low and high pressure fuel flows 40, 44 merge and mix one with the other. The mixed low and high pressure fuel flows 40, 44 in the pre-mixing area of the annular chamber 52 must pass through holes in the annular perforated baffle 54 in order to enter the fuel filter assembly 28 via the filter entry 48a. The dimension of each of the holes in the annular perforated baffle 54 is smaller than the dimension of the filter entry 48a (the width of the annular gap between the supporting end plate 28c and the fuel filter assembly 34 in this embodiment) and thus transient icing may occur on a side of the annular perforated baffle 54 facing the oncoming mixed low and high pressure fuel flows 40, 44, rather than on the fitter entry 48a or in the fuel filter assembly 28.

The annular perforated baffle 54 in the annular chamber 52 provides an increased ice catching capability due to the relatively large fuel contacting surface area and relatively small holes of the baffle 54 and due to the relatively large space for accommodating ice accumulation 60 within the annular chamber 52, as illustrated in FIG. 3.

Optionally, an ice protection lip 56 such as an annular configuration longitudinally located between the annular perforated baffle 54 and the valve entry 30e (adjacent the latter), and extending radially and outwardly from the cylindrical valve supporting body 30c, may be provided to prevent transient ice formed and accumulated on the annular perforated baffle 54 from spreading into the valve entry 30e. When the fuel pressure in the annular chamber 52 increases to a predetermined level due to the transient ice formation and accumulation blocking the small holes in the perforated baffle 54, the bypass valve assembly 30 is forced to open against the bias spring force, allowing the low and high pressure fuel flows 40, 44 mixed in the annular chamber 52 to enter the central passage 50, thereby bypassing the filtering unit 28a. When fuel flow no longer passes through the perforated baffle 54, further transient icing on the annular perforated baffle 54 discontinues and the ice formed and accumulated on the annular perforated baffle 54 may be eventually melted by heat transferred directly from the FOHE 34 and transferred indirectly by the warm high pressure fuel flow 44 which has been heated while passing through the FOHE 34 and discharged from the longitudinal end 34a. When the ice has been melted and cleared from the holes in the annular perforated baffle 54, the fuel in the annular chamber 52 can again pass through the perforated baffle 54 to enter the fuel filter assembly 28 via the filter entry 48a and the bypass valve assembly 30 closes, as illustrated in FIG. 4.

Figure 6:
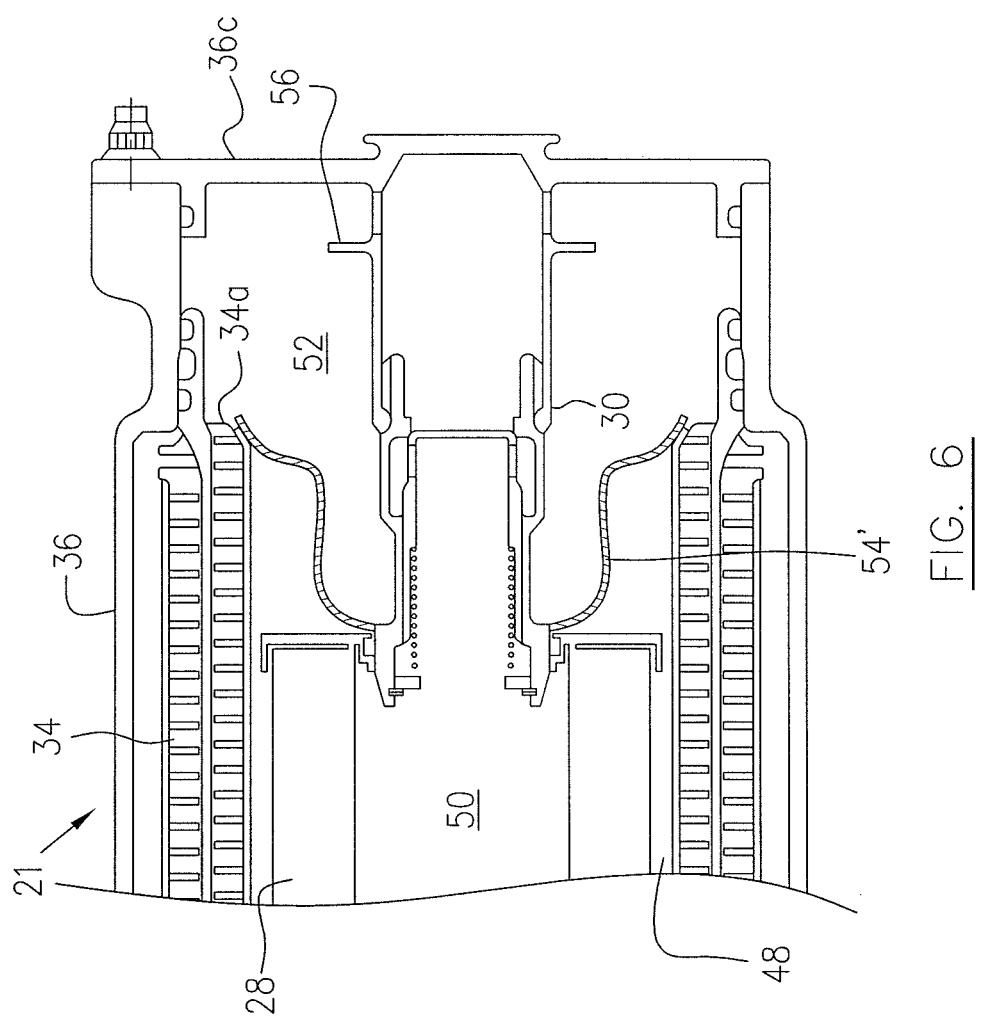
FIG. 6 is a partial side cross-sectional view of the apparatus of FIG. 2, showing the ice accretion device according to another embodiment.

FIG. 6 illustrates another embodiment of the apparatus 21 in which components similar to those in FIG. 2 will not be redundantly described herein. The annular perforated baffle 54' which replaces the annular perforated baffle 54 in FIG. 2, may be configured with a number of curvatures in order to increase the fuel contacting surface area thereof. Alternatively, the annular perforated baffle 54' may have a generally truncated conical configuration as the annular perforated baffle 54 in FIG. 2, but the annular perforated baffle 54' may be corrugated in order to increase the fuel contacting surface area thereof.

Figure 7:
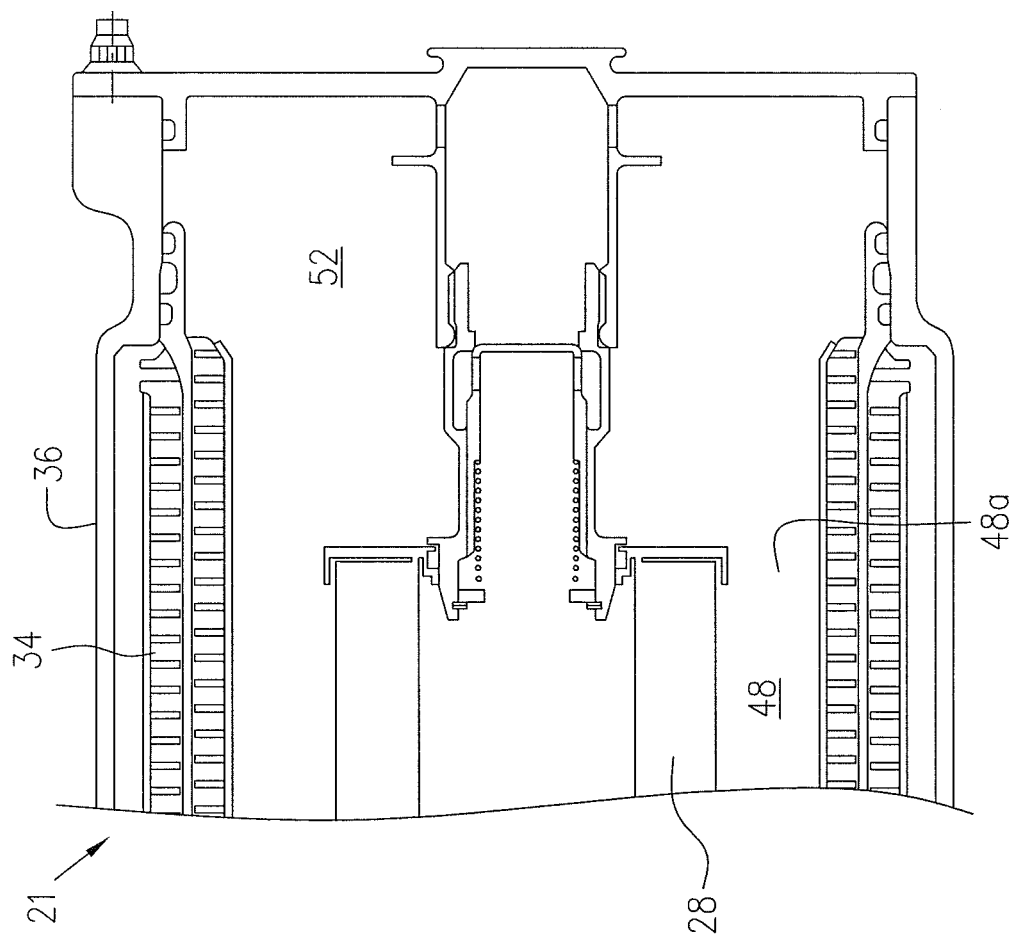
FIG. 7 is a partial side cross-sectional view of the apparatus of FIG. 2, according to a further embodiment.

FIG. 7 illustrates the apparatus 21 according to a further embodiment in which components similar to those shown in FIG. 2 will not be redundantly described herein. The embodiment of FIG. 7 does not include an annular perforated baffle 54 (as in FIG. 2), however, the diametrical dimension of the housing 36 and the annular FOHE 34 may be increased to thereby increase the annular gap 48 and annular dimension of the filter entry 48a between the fuel filter assembly 28 and the annular FOHE 34, in order to increase the ice catching capability of the apparatus 21, and to thus improve filtering efficiency.

Figure 8:
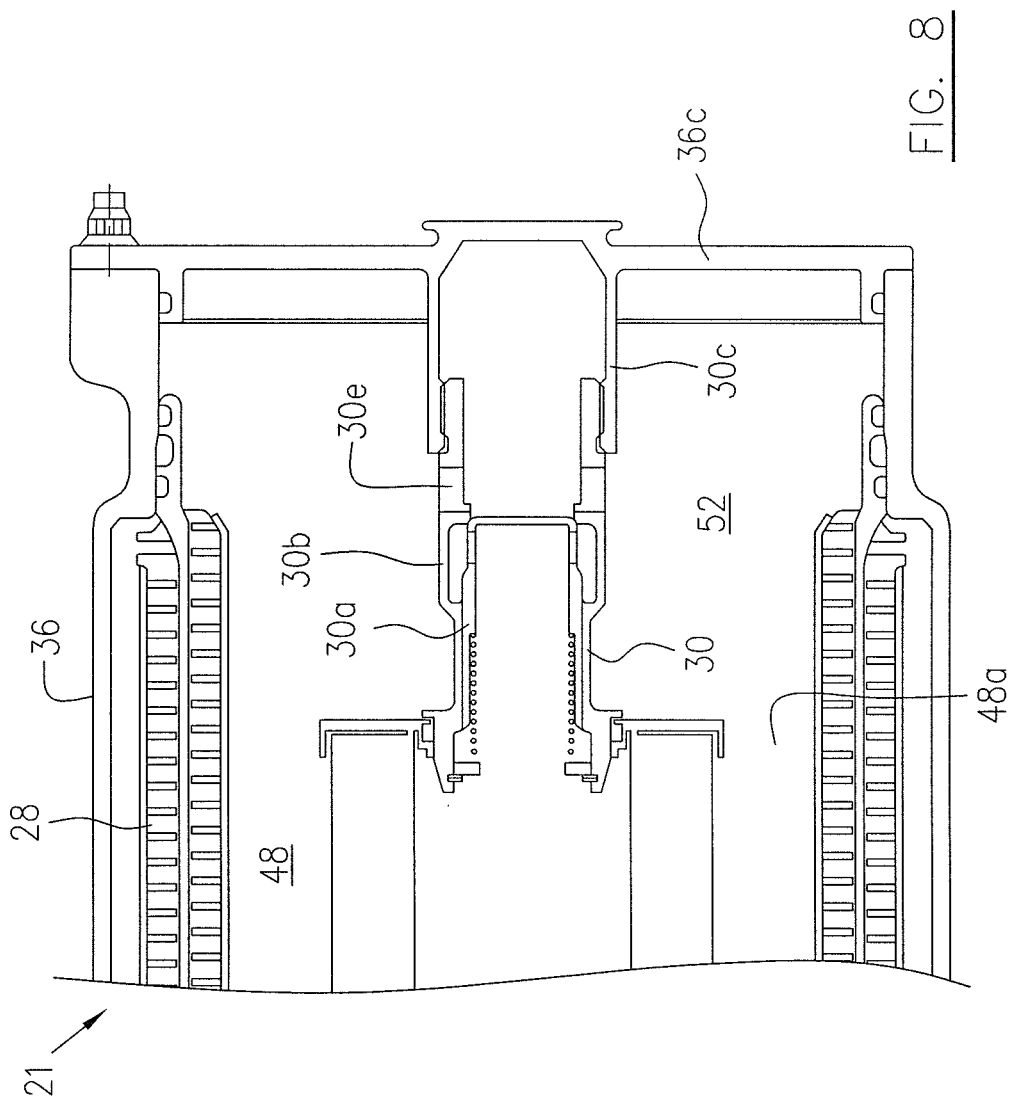
FIG. 8 is a partial side cross-sectional view of the apparatus of FIG. 2, according to a still further embodiment.

FIG. 8 illustrates the apparatus 21 according to a still further embodiment in which components similar to those shown in FIG. 2 will not be redundantly described herein. Similar to the embodiment of FIG. 7, the embodiment of FIG. 8 does not include an annular perforated baffle 54 (as in FIG. 2), however, the valve entry 30e of the bypass valve 30 may include a plurality of circumferentially spaced openings located further away from the cap plate 36c, and may be defined in the valve seat 30b, instead of in the cylindrical valve supporting body 30c because the space within the annular chamber 52 is fully used for fuel pre-mixing but is not used for accommodating ice accumulation therein. For the reasons discussed with reference to the embodiment shown in FIG. 7, the diametrical dimension of the housing 36, the annular FOHE 34, the annular gap 48 and the annular dimension of filter entry 48a between the annular FOHE 34 and the fuel filter assembly 28, may be increased accordingly to thereby increase filtering efficiency.

The embodiments illustrated in FIGS. 2-6 advantageously deploy an ice accretion device such as the perforated baffle 54, 54' in the space surrounding the bypass valve assembly 30 to create a relatively increased ice catching capability outside of the fuel filter assembly 28 and provides the possibility to reduce the diametrical size of the housing 36 and FOHE 34 (due to the smaller annular gap required between the fuel filter assembly 28 and the FOHE 34), resulting in weight and cost savings.

The above description is meant to be exemplary only, and one skilled in the art will recognize that changes may be made to the embodiments described without departing from the scope of the described subject matter. For example, the described subject matter may be applicable in aircraft gas turbine engines of types other than a turbofan gas turbine engine as illustrated in the drawings and described above. The particular components such as the housing, FOHE, fuel filter assembly, bypass valve assembly and perforated baffle may be in shapes and configurations different from those illustrated in the drawings and described above. Modifications which fall within the scope of the described subject matter will be apparent to those skilled in the art, in light of a review of this disclosure, and such modifications are intended to fall within the appended claims.

The invention claimed is:

1. A gas turbine engine having a fuel system including an apparatus, the apparatus comprising: a housing defining a longitudinal axis and containing a fuel filter assembly and a fuel/oil heat exchanger, the housing defining a chamber extending longitudinally between the fuel filter assembly and an end wall of the housing, a bypass valve assembly within the chamber and connected to the fuel filter assembly, the chamber being in fluid communication with the fuel filter assembly via a filter entry, the housing including a first inlet port for introducing a first fuel flow into the chamber and a second inlet port for introducing a second fuel flow into the chamber, the second inlet port being in fluid communication with the chamber via the fuel/oil heat exchanger such that the second fuel A flow is heated before a mixing with the first fuel flow in the chamber, the first and second inlet ports being positioned such that the first and second fuel flows mix one with the other within the chamber prior to entering the fuel filter assembly via the filter entry, and the bypass valve assembly being open only when a fuel pressure in the chamber rises to a predetermined level, to allow the chamber to be selectively in fluid communication with a bypass passage which bypasses a filtering unit of the fuel filter assembly.

2. The gas turbine engine as defined in claim 1 wherein the first inlet port is located adjacent the end wall of the housing and is oriented in a tangential direction with respect to the longitudinal axis.

3. The gas turbine engine as defined in claim 1 wherein the fuel/oil heat exchanger is annular and positioned around the fuel filter assembly, the filter entry being formed with an annular gap located radially between the fuel/oil heat exchanger and the fuel filter assembly.

4. The gas turbine engine as defined in claim 1 wherein the chamber is annular and positioned around the bypass valve assembly, the first inlet port being tangentially oriented with respect to the longitudinal axis to direct the first fuel flow to move circumferentially in the annular chamber and the fuel/oil heat exchanger being configured and positioned such that the heated second fuel flow discharged from the fuel/oil heat exchanger flows radially inwardly within the annular chamber for mixing with the circumferential first fuel flow prior to entering the filter entry or a valve entry of the bypass valve assembly.

5. The gas turbine engine as defined in claim 4 wherein the apparatus comprises an ice accretion device located within the chamber and surrounding the bypass valve assembly to allow ice formation and accumulation on the device, an end of the fuel/oil heat exchanger extending longitudinally into the chamber and surrounding the ice accretion device for discharging the heated second fuel flow from said end of the fuel/oil heat exchanger into an area of the chamber to mix with the first fuel flow.

6. A gas turbine engine having a fuel system including an apparatus, the apparatus comprising: a housing defining a longitudinal axis and containing a fuel filter assembly, a bypass valve assembly and an ice accretion device within the housing, the bypass valve assembly being connected to the fuel filter assembly, the housing defining a chamber surrounding the bypass valve assembly, and having a first inlet port for introducing a first fuel flow into the chamber, the chamber extending longitudinally between the fuel filter assembly and an end wall of the housing, the chamber being in fluid communication with the fuel filter assembly via a filter entry and being in fluid communication with the bypass valve assembly via a valve entry, the ice accretion device being positioned in the chamber between the filter entry and the valve entry to allow ice formation and accumulation on the device, the bypass valve assembly being open only when a fuel pressure in the chamber rises to a predetermined level, to allow fluid communication between the chamber and a bypass passage which bypasses a filtering unit of the fuel filter assembly.

7. The gas turbine engine as defined in claim 6 wherein the ice accretion device comprises a perforated baffle positioned and oriented such that the first fuel flow has to pass through the perforated baffle in order to enter the fuel filter assembly via the filter entry.

8. The gas turbine engine as defined in claim 6 wherein the ice accretion device comprises an annular perforated baffle including a first end having a first diameter and second end having a second diameter greater than the first diameter, the baffle being positioned around the bypass valve assembly and adjacent the fuel filter assembly.

9. The gas turbine engine as defined in claim 6 wherein the apparatus comprises an ice-protection lip extending outwardly from the bypass valve assembly and located longitudinally between the valve entry and the ice accretion device.

10. The gas turbine engine as defined in claim 9 wherein the valve entry is located adjacent the end wall of the housing and wherein the ice protection lip is located adjacent the valve entry.

11. The gas turbine engine as defined in claim 6 wherein the apparatus further comprises a fuel/oil heat exchanger within the housing, the housing including a second inlet port configured for introducing a second fuel flow to pass through and to be heated within the fuel/oil heat exchanger and to then be discharged into the chamber to mix with the first fuel flow within the chamber.

12. The gas turbine engine as defined in claim 11 wherein the fuel/oil heat exchanger surrounds the fuel filter assembly, the filter entry being formed with a gap between the fuel filter assembly and the fuel/oil heat exchanger.

13. The gas turbine engine as defined in claim 12 wherein the fuel/oil heat exchanger comprises an end extending longitudinally into the chamber to discharge the heated second fuel flow from said end of the fuel/oil heat exchanger into an area of the chamber to mix with the first fuel flow before the first fuel flow passes through the ice accretion device toward the filter entry.

14. The gas turbine engine as defined in claim 13 wherein the ice accretion device comprises an annular perforated baffle having longitudinally opposed first and second ends, the first end being supported on the bypass valve assembly adjacent the fuel filter assembly and the second end being supported on said end of the fuel/oil heat exchanger.

15. The gas turbine engine as defined in claim 6 wherein the first inlet port is located adjacent the end wall of the housing and is oriented in a tangential direction with respect to the longitudinal axis.

16. A gas turbine engine having a fuel system including an apparatus, the apparatus comprising: a housing defining a longitudinal axis and containing a fuel filter assembly, a bypass valve assembly, a fuel/oil heat exchanger and a perforated baffle within the housing, the housing defining a chamber surrounding the bypass valve assembly, the chamber extending longitudinally between the fuel filter assembly and an end wall of the housing, the chamber being in fluid communication with the fuel filter assembly via a filter entry and being in fluid communication with the bypass valve assembly via a valve entry, the perforated baffle being positioned in the chamber between the filter entry and the valve entry to allow ice formation and accumulation on the perforated baffle, the bypass valve assembly being open only when a fuel pressure in the chamber rises to a predetermined level, to allow fluid communication between the chamber and a bypass passage which bypasses a filtering unit of the fuel filter assembly, the housing defining a first inlet port for introducing a first fuel flow into the chamber and a second inlet port for introducing a second fuel flow to pass through and to be heated by the fuel/oil heat exchanger and then enter the chamber such that the first and second fuel flows mix one with the other in the chamber prior to entering into the filter entry or the valve entry.

17. The gas turbine engine as defined in claim 16 wherein the perforated baffle is positioned around the bypass valve assembly such that the first and second fuel flows mixed in the chamber have to pass through the perforated baffle in order to enter the fuel filter assembly via the filter entry.

18. The gas turbine engine as defined in claim 16 wherein the first inlet port is oriented in a tangential direction with respect to the longitudinal axis to direct the first fuel flow to move circumferentially in the chamber and wherein the fuel/oil heat exchanger is configured and positioned such that the heated second fuel flow discharged from the fuel/oil heat exchanger flows radially inwardly within the chamber for mixing with the circumferential first fuel flow in the chamber.

\* \* \* \* \*